Patented Dec. 1, 1936

2,062,958

UNITED STATES PATENT OFFICE 2,062,958

ETHER COMPOUNDS

Alfred William Baldwin, Sale, and Anthony James Hailwood, Altrincham, England, assignors to Imperial Chemical Industries Limited, a corporation of Great Britain No Drawing. Application April 10, 1936, Serial No. 73,808. In Great Britain May 16, 1931

5 Claims. (Cl. 260—151)

This invention relates to chemical compounds, more particularly substances exhibiting in a pronounced degree the properties of wetting, detergent, foaming and dispersive agents, and a process for the manufacture thereof.

As is well known, ordinary wetting agents and detergents such as soaps, i. e., the alkali metal salts of the fatty acids, are of little or no value for use in acidic solutions because the water-soluble alkali metal salts are converted into the water-insoluble fatty acids. Furthermore, soaps are precipitated in hard water by salts of calcium, magnesium, and the like.

It is an object of the present invention to produce new substances which possess wetting, detergent, foaming and dispersive properties in acid solutions and hard water. A further object is the production of compounds which do not suffer decomposition by the action of hydrolytic agencies. A still further object is the provision of a new and improved process for producing products of the character above described. Other objects will appear hereinafter.

These objects are accomplished according to the present invention by combining a saturated or unsaturated branched chain aliphatic radical and a beta-sulfoethyl group by means of an ether link to produce compounds having the general formula

I. ROCH$_2$CH$_2$SO$_3$H or

II. ROCH$_2$CH$_2$SO$_3$M in which R represents a saturated or unsaturated branched chain aliphatic radical, preferably containing at least six carbon atoms, and M represents an alkali metal. The process of the invention may be carried out by reacting an alkali metal alkoxide having the formula

ROM wherein R and M have the foregoing signification, with an alkali metal beta-halogenethane sulfonate, the resultant product being the alkali metal salt of the sulfo-acid represented by Formula II. The reaction is preferably effected in a solvent or suspension medium. The free sulfo-acid may be formed from its alkali metal salt in any suitable manner, e. g., by treatment with a dilute mineral acid.

While the invention is susceptible of considerable variation and modification in the manner of its practical application, particularly as regards the nature and proportions of materials employed and the exact method of procedure, the following examples, in which the parts are by weight, will illustrate some of the products falling within the invention and how they may be prepared.

Example I

Dissolve 7.4 parts of the branched chain alcohol mixture obtained by the hydrogenation of carbon monoxide (fraction boiling from 162°–202° C. containing 55% seven, eight and nine carbon atom branched chain primary alcohols, 33% nine and ten carbon atom branched chain secondary alcohols and 12% ketones and esters) in 50 parts of xylene, and boil the solution under reflux with 2.3 parts of finely ground sodamide until ammonia ceases to be evolved. Add 12 parts of sodium beta-bromoethane sulfonate, in finely divided state, and reflux with vigorous agitation for fifteen hours. Remove the xylene by distillation under reduced pressure. The product is essentially a branched chain ether sulfonate mixture containing an aliphatic chain of from nine to twelve carbon atoms. It may be freed from impurities in any suitable manner, e. g., by dissolving in water and salting out.

Example II

Dissolve 9.5 parts of 4-butyl-octanol-1 in 50 parts of xylene and boil the solution under reflux with 2.3 parts of finely ground sodamide until ammonia ceases to be evolved. Add 12 parts of sodium beta-bromoethane sulfonate, in finely divided state, and reflux with agitation for fifteen hours. Remove the xylene by distillation under reduced pressure and purify as in Example I. The product is the corresponding alkyl ether sodium sulfonate.

Instead of sodium beta-bromoethane sulfonate, chemically equivalent proportions of sodium beta-chloroethane sulfonate may be employed.

It will be understood that the invention is not limited by the above examples. The products may be any compounds having the general formula

III. ROCH$_2$CH$_2$SO$_3$X in which R represents a saturated or unsaturated branched chain aliphatic radical, preferably containing at least six carbon atoms, and X represents hydrogen or an alkali metal (preferably potassium or sodium).

The branched chain aliphatic alcohols employed as starting materials in accordance with the invention are preferably synthetic higher alcohols, for example, those obtained by the hydrogenation of carbon oxides under elevated temperatures and pressures. The invention is likewise applicable to the treatment of mixtures of any of the foregoing alcohols, e. g., complex mixtures of synthetic alcohols boiling above about 160° C. (see Example I) and, in general, to the treatment of any branched chain alcohols. As further examples may be mentioned linalool and geraniol.

As previously indicated, a solvent or suspension medium may be employed in effecting the reaction. By a "solvent or suspension medium" is meant any liquid which is inert to the reactants and products or does not affect the reaction unfavorably. As examples of such solvent or suspension media, we may mention xylene and toluene.

This application is a continuation in part of our co-pending application Serial No. 609,768 filed May 6, 1932, which relates not only to branched chain compounds but, also, to straight chain derivatives as obtained, for example, from dodecyl, cetyl, oleyl and similar alcohols.

The temperature employed in carrying out the reaction between the alkali metal alkoxide and the alkali metal beta-halogenoethane sulfonate may vary within relatively wide limits but, in any case, should be below the temperature giving rise to decomposition of the products.

The products, viz, the sulfo-acids and alkali metal salts thereof having a long chain, possess soap-like properties, are stable to acids and can be used in calcareous or other hard water. Further, they do not suffer decomposition by the action of hydrolytic agencies. It will be understood, of course, that the various products may differ as regards certain characteristics. They are particularly useful in the textile industry, e. g., in cleansing and scouring baths for textiles.

As many apparent and widely different embodiments of this invention may be made without departing from the spirit thereof, it is to be understood that we do not limit ourselves to the foregoing examples or description except as indicated in the following claims.

We claim:

1. Compounds having the general formula $$ROCH_2CH_2SO_3X$$

wherein R represents a branched chain aliphatic radical of alcohols obtainable by the hydrogenation of carbon oxide, and X represents hydrogen or an alkali metal.

2. New compounds having the general formula $$ROCH_2CH_2SO_3X$$

wherein R represents a branched chain aliphatic hydrocarbon radical containing at least six carbon atoms, and X represents hydrogen or an alkali metal.

3. Compounds having the general formula $$ROCH_2CH_2SO_3X$$

wherein R represents a branched chain aliphatic radical of alcohols containing at least six carbon atoms obtainable by the hydrogenation of carbon oxide under high temperatures and pressures, and X represents hydrogen or an alkali metal.

4. The process which comprises reacting a branched chain alcohol with sodamide in the presence of an alkylated benzene as the solvent, whereby a sodium alcoholate is formed, and heating the resultant solvent reaction mixture with a sodium beta-halogenoethane sulfonate.

5. The process of claim 4 in which the reaction is effected with a mixture of branched chain aliphatic alcohols containing at least six carbon atoms, obtainable by the hydrogenation of carbon oxide under high temperatures and pressure.

ANTHONY JAMES HAILWOOD.
ALFRED WILLIAM BALDWIN.